(12) United States Patent
Goldin et al.

(10) Patent No.: US 7,574,702 B2
(45) Date of Patent: Aug. 11, 2009

(54) METHOD AND APPARATUS FOR HYBRID STACK WALKING

(75) Inventors: Maxim Goldin, Redmond, WA (US); Thushara Wijeratna, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 615 days.

(21) Appl. No.: 11/083,843

(22) Filed: Mar. 18, 2005

(65) Prior Publication Data
US 2006/0212844 A1 Sep. 21, 2006

(51) Int. Cl.
*G06F 9/45* (2006.01)
*G06F 9/44* (2006.01)

(52) U.S. Cl. ........................ 717/148; 717/127

(58) Field of Classification Search .................. 717/148, 717/127
See application file for complete search history.

(56) References Cited

U.S. PATENT DOCUMENTS

| | | | | |
|---|---|---|---|---|
| 6,415,381 B1* | 7/2002 | Bak et al. | .................... | 712/244 |
| 6,442,751 B1* | 8/2002 | Cocchi et al. | ................ | 717/133 |
| 6,513,156 B2* | 1/2003 | Bak et al. | .................... | 717/151 |
| 6,560,774 B1* | 5/2003 | Gordon et al. | .............. | 717/146 |
| 6,754,890 B1* | 6/2004 | Berry et al. | ................... | 717/128 |
| 6,766,513 B2* | 7/2004 | Charnell et al. | ............. | 717/154 |
| 6,898,611 B1* | 5/2005 | Dussud et al. | .............. | 707/206 |
| 6,904,594 B1* | 6/2005 | Berry et al. | ................... | 718/100 |
| 7,114,150 B2* | 9/2006 | Dimpsey et al. | ............ | 717/131 |
| 7,178,132 B2* | 2/2007 | Pierce | ......................... | 717/127 |
| RE39,519 E * | 3/2007 | Bak et al. | .................... | 712/244 |
| 7,380,242 B2* | 5/2008 | Alaluf | ......................... | 717/148 |
| 7,389,497 B1* | 6/2008 | Edmark et al. | .............. | 717/130 |
| 2004/0083460 A1 | 4/2004 | Pierce | | |
| 2005/0183068 A1* | 8/2005 | Cwalina et al. | ............. | 717/128 |
| 2006/0070044 A1* | 3/2006 | Romanovski et al. | ....... | 717/136 |
| 2006/0101032 A1* | 5/2006 | Sutter et al. | .................. | 707/100 |
| 2006/0101412 A1* | 5/2006 | Lev et al. | .................... | 717/127 |

OTHER PUBLICATIONS

Acheson et al., "Hosting the .NET Runtime in Microsoft SQL Server", Jun. 2004, SIGMOD '04: Proceedings of the 2004 ACM SIGMOD international conference on Management of data , pp. 1-6, http://delivery.acm.org/10.1145/1010000/1007669/p860-acheson.pdf?key1=1007669&key2=2325284021&coll=ACM&dl=ACM&CFID=58110259&CFTOKEN=97146682.*

(Continued)

*Primary Examiner*—Wei Y Zhen
*Assistant Examiner*—Chih-Ching Chow
(74) *Attorney, Agent, or Firm*—Wolf, Greenfield & Sacks, P.C.

(57) ABSTRACT

In one embodiment, a method and apparatus for stack walking a call stack associated with mixed code, by interleaving a native stack walking process with a managed stack walking process. Mixed code comprises at least one managed instruction and at least one native instruction, and the call stack comprises at least one managed frame and at least one native frame. The managed frames being associated with the managed instructions, and the native frames being associated with native instructions. The method comprises acts of performing a managed stack walk on the call stack, a native stack walk on native frames of the call stack. In a further embodiment, handling indirect jumps during a native stack walk, and in another embodiment, detecting validity of a memory address.

20 Claims, 7 Drawing Sheets

OTHER PUBLICATIONS

Paul et al., ".NET Security: Lessons Learned and Missed from Java",Computer Security Applications Conference, 2004. 20th Annual Dec. 6-10, 2004 pp. 272-281, http://ieeexplore.ieee.org/iel5/9473/30059/01377234.pdf?tp=arnumber=1377234&isnumber=30059.*

Wikipedia, definition for "NOP", http://en.wikipedia.org/wiki/NOP.*

Kate Gregory, "Managed, Unmanaged, Native: What Kind of Code Is This?" http://www.codeguru.com/csharp/.net/cpp_managed/article.php/c4871, Apr. 28, 2003, pp. 1-2.*

David Broman, "David Broman's CLR Profiling API Blog", pp. 1-12, MSDN Blogs; http://blogs.msdn.com/davbr/archive/2005/10/06/478006.aspx.*

* cited by examiner

_US 7,574,702 B2_

METHOD AND APPARATUS FOR HYBRID STACK WALKING

FIELD OF INVENTION

The present invent relates to systems and method for stack walking hybrid code.

BACKGROUND OF INVENTION

Software code profiling tools may be used to assemble information about executing code, and therefore allow for the identification of critical paths, enabling the improvement of the overall performance of software under development. For example, a sampling profiler may capture a snapshot of a currently executing instruction when taking a sample of executing code at predefined time intervals. Such an approach may result in low overhead and may be used to assemble information about executing modules and/or functions in the code.

SUMMARY OF INVENTION

Various embodiments of the invention are directed to methods and apparatus for stack walking a call stack associated with mixed code. The mixed code comprises at least one managed instruction and at least one native instruction, and the call stack comprises at least one managed frame and at least one native frame. The at least one managed frame is associated with the at least one managed instruction, and the at least one native frame is associated with the at least one native instruction. The method of stack walking a call stack associated with mixed code comprises performing a managed stack walk on the call stack, and performing a native stack walk on the at least one native frame of the call stack.

In further embodiments, methods and apparatus are provided for performing a native stack walk on the at least one managed frame of the call stack, where the native stack walk on the at least one managed frame of the call stack comprises, upon encountering a NOP indirect jump instruction, proceeding to the next instruction.

In further embodiments, methods and apparatus are provided for performing a native stack walk on the at least one managed frame of the call stack, where the native stack walk on the at least one managed frame of the call stack comprises reading a memory location using a memory validating function, and moving onto a specific instruction in the memory validating function in response to intercepting an exception due to reading the memory location.

BRIEF DESCRIPTION OF DRAWINGS

In the drawings, each identical or nearly identical component that is illustrated in various figures is represented by a like numeral. For purposes of clarity, not every component may be labeled in every drawing. In the drawings.

DETAILED DESCRIPTION

Applicants have appreciated that it would be beneficial for a sampling profiler to detect not only a function that was being executed upon sampling, but also to detect and report information about the execution calling stack. Applicants have also appreciated that the implementation of a super fast stack walk for mixed code, containing a mixture of both native and managed code, and its incorporation into a sampling profiler enables the detection of calls executed preceding the sample. Moreover, in contrast to a debugger, a profiler need not require symbol data, therefore making the profiling stack walk process more effective and reducing overhead.

Typically, an executing program may have multiple functions, procedures, or methods (hereafter referred to as functions) that may be called during program execution. In particular, functions may call other functions, and a call stack in memory may contain the state information relating to the call chain. The call stack is a region of memory where a program stores status data associated with called functions, which may include parameters, local variables, return addresses, and/or any other information, as the invention is not limited in this respect.

Figure 1:
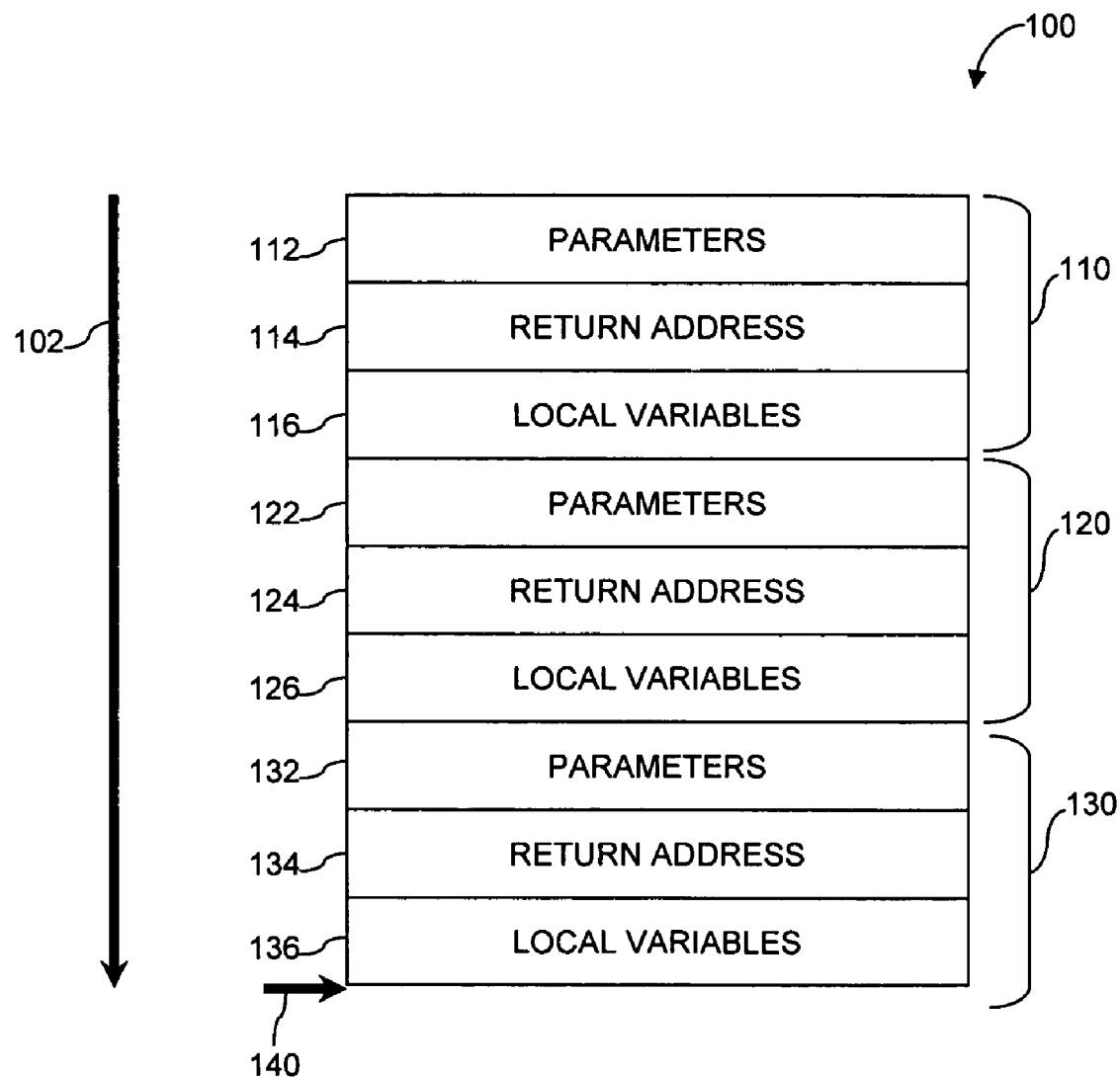
FIG. 1 is a diagram of prior art call stack.

FIG. 1 is an example illustrating a call stack 100. In the illustration presented, the call stack grows downwards 102 as status data is pushed onto the stack. This status data may comprise function input parameters, local variables, and return addresses. In call stack 100, a first frame 110 containing status data associated with a first function is stored at the top of the call stack 100, and may include input parameters 112 received by the first function as input, local variables 116 created within the first function, and a return address 114 indicating where an instruction pointer should point, in a binary image (i.e., a native image in memory) of the executing instructions, upon completing execution of the first function.

As a result of the first function calling a second function, a second frame 120 associated with the second function is pushed on top of the first frame 110. As in the case of the first frame 110, the second frame 120 may contain parameters 122 received by the second function as input, local variables 126 created within the second function, and a return address 124 indicating where the instruction pointer should point, in a binary image of the executing instructions, upon completing execution of the second function.

Lastly, in this example, as a result of the second function calling a third function, a third frame 130 is pushed onto the second frame 120, and the third frame may contain parameters 132 received by the third function as input, local variables 136 created within the third function, and a return address 134 indicating where an instruction pointer should point, in a binary image of the executing instructions, upon completing execution of the third function. The third frame 130 is located on the top of call stack 100 and is called the active frame. In addition, a stack pointer 140 points to the top of the call stack 100.

A call stack 100 may also include frame pointers (not shown) which point to the previous stack frame. In some instances, each frame may include a frame pointer that points to the previous stack frame. Conventional stack walkers may utilize frame pointers to aid in walking the stack, but the invention need not be limited to the use of frame pointers, and other techniques may be used to walk the stack.

Moreover, call stack 100 is merely an example illustrating a call stack comprising three frames, but in general, any number of frames may be stacked on the call stack. For example, hundreds or thousands of frames may be stacked on the call stack, corresponding to hundreds or thousands of function calls in the executing call chain.

Numerous techniques are available to walk the stack so as to produce call chain information that describes the calling chain of functions, which may be accomplished using an instruction pointer (pointing to the instruction in the binary image of the executing program when the program was locked or interrupted), the call stack, and the binary image of the function that was currently executing, as described in U.S. patent application Ser. No. 10/279,550 entitled "FORWARD WALKING THROUGH BINARY CODE TO DETERMINE OFFSETS FOR STACK WALKING," filed on Oct. 23, 2002, and now issued as U.S. Pat. No. 7,178,132, by Kenneth Bryant Pierce, the entire disclosure of which is incorporated herein by reference. The stack may also be walked using various other techniques, including using frame pointers that may be present in a call stack, using debug information (i.e., PDB files which may identify return addresses within a call stack), or using any other information or technique, as the invention is not limited by in this respect.

Traditionally, program code has consisted solely of native code (i.e., binary code) compiled only once from source code (e.g., C, C++, etc.), and as such, stack walkers have been tailored and optimized for such native code. With the advent of managed code (i.e., code that was at some time during compilation transformed into machine-independent intermediate language code) and mixed code containing both managed and native code, traditional native stack walking techniques may be deficient.

Applicants have appreciated that a hybrid stack walker may account for the mixed nature of mixed code and may be utilized to interleave native stack walking and managed stack walking methods. Applicants have also realized that managed code may present issues associated with indirect jumps during stack walking of managed code, and with the detection of memory address validity.

Figure 2:
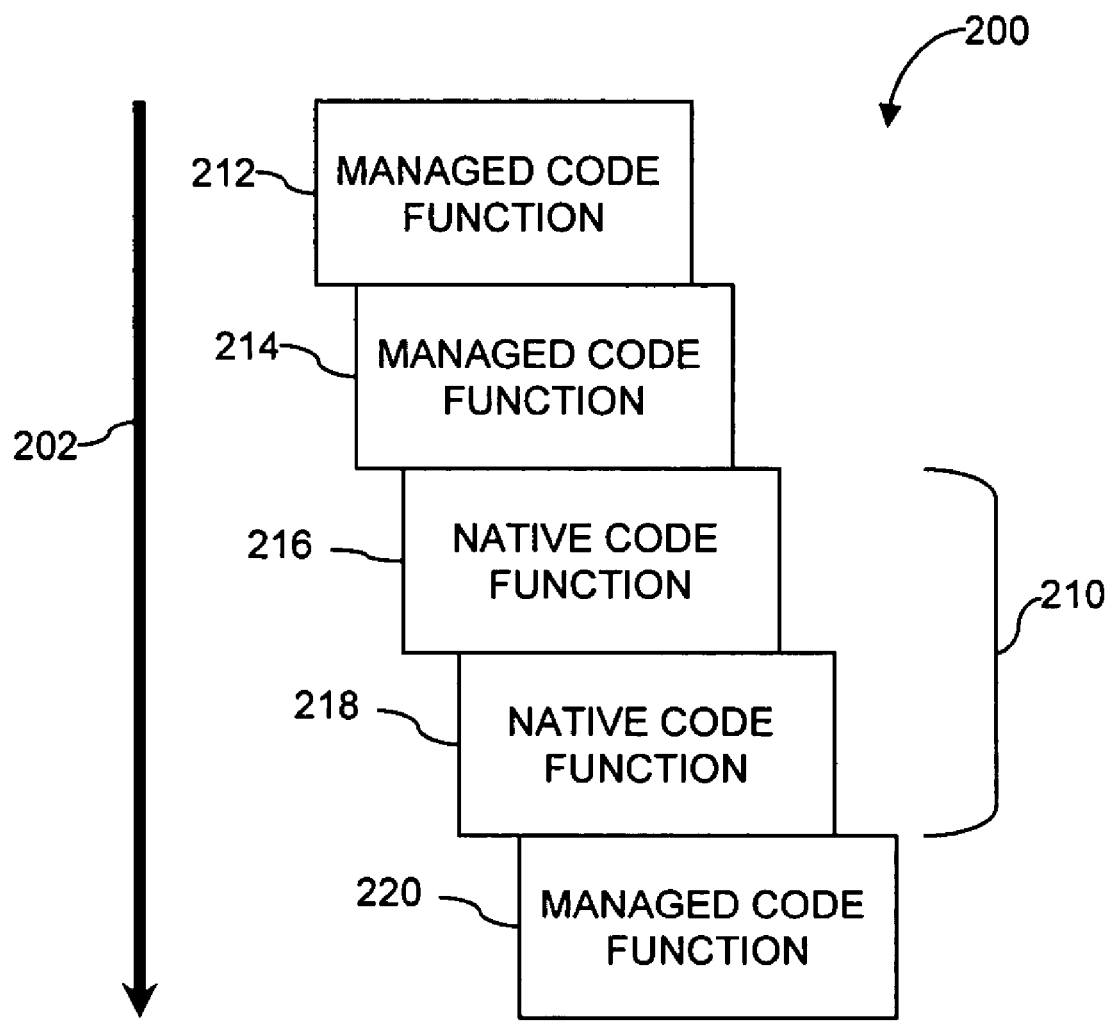
FIG. 2 is a block representation of a mixed code calling chain.

As an example, FIG. 2 illustrates a schematic block level representation of a mixed code calling chain 200 comprising both managed code functions and native code functions. The calling chain 200 begins in managed code function 212 and proceeds downwards 202 as result of a executing call to managed code function 214 from within the managed code function 212. In turn, managed code function 214 may call a native code function 216, and then, in this example, native code function 216 may call native code function 218. Lastly, native code function 218 may call managed code function 220.

As shown in this example, managed code functions can call both native and managed code, and similarly, native code functions may also call both native and managed code. Within this context, blocks of native code that directly called each other are referred to as native sub-chains. Also, since the function calling chain is reflected in the frames of the call stack, managed code functions have corresponding call stack frames are referred to as managed frames, and native code functions have corresponding call stack frames referred to as native frames. Similarly, a group of adjacent native frames is referred to as a native frame sub-chain. Furthermore, an instruction in managed code is called a managed instruction, and an instruction in native code is called a native instruction.

As previously state, managed code existed as intermediate language (IL) code at some point during its lifetime. The intermediate language code may be a machine and operating system independent form of machine language and may be generated by compiling source code using an intermediate language compiler. The intermediate language may also be an object oriented language. The source code may include any type of code that may be compiled to an intermediate language, including C#® offered by Mircosoft Corporation, or any other language as the invention is not limited in this respect. The intermediate language compiler may be any complier that compiles source code into intermediate language code, for example any intermediate language compiler provided in the Microsoft®.NET framework offered by Microsoft Corporation, including but not limited to a Just-in-Time (JIT) compiler that dynamically creates a native image of intermediate language code during the execution of a program, a Native Image Generator (NGEN) that creates native images of intermediate language code prior to execution and stores the native images in a native image cache, or any other Intermediate language compiler, as the invention is not limited in this respect. Furthermore, one or more intermediate language compilers may be included in a multi-language execution environment. An example of a multi-language execution environment is the Common Language Runtime (CLR) environment provided in the Microsoft®.NET framework which may initiate and control a .NET program, provide JIT and NGEN compilation, enable application, memory, and thread management, and provide various other runtime services.

Traditional stack walking mechanisms using a native stack walker may detect a calling chain by disassembling executing instructions and analyzing the current call stack. However, for managed and mixed code, an exact chain of managed frames may be extracted using a managed stack walker.

For instance, the DoStackSnapshot method, provided by the ICorProfilerInfo2 interface of the Microsoft®.NET framework, implements a managed stack walking process. Managed stack walkers are able to analyze managed code, but may not provide information for all native frames. For example, a managed stack walker may only provide a native representative frame for each native sub-chain, which may actually contain a plurality of native frames. Moreover, a managed stack walker may return no frames when a program sample occurs while the instruction pointer is in a native code function, even when there are multiple managed frames in the call stack.

In accordance with one embodiment, in a mixed code program, containing a mixture of both native and managed code functions, stack walking may be accomplished by interleaving a native stack walking process with a managed stack walking process.

Figure 3:
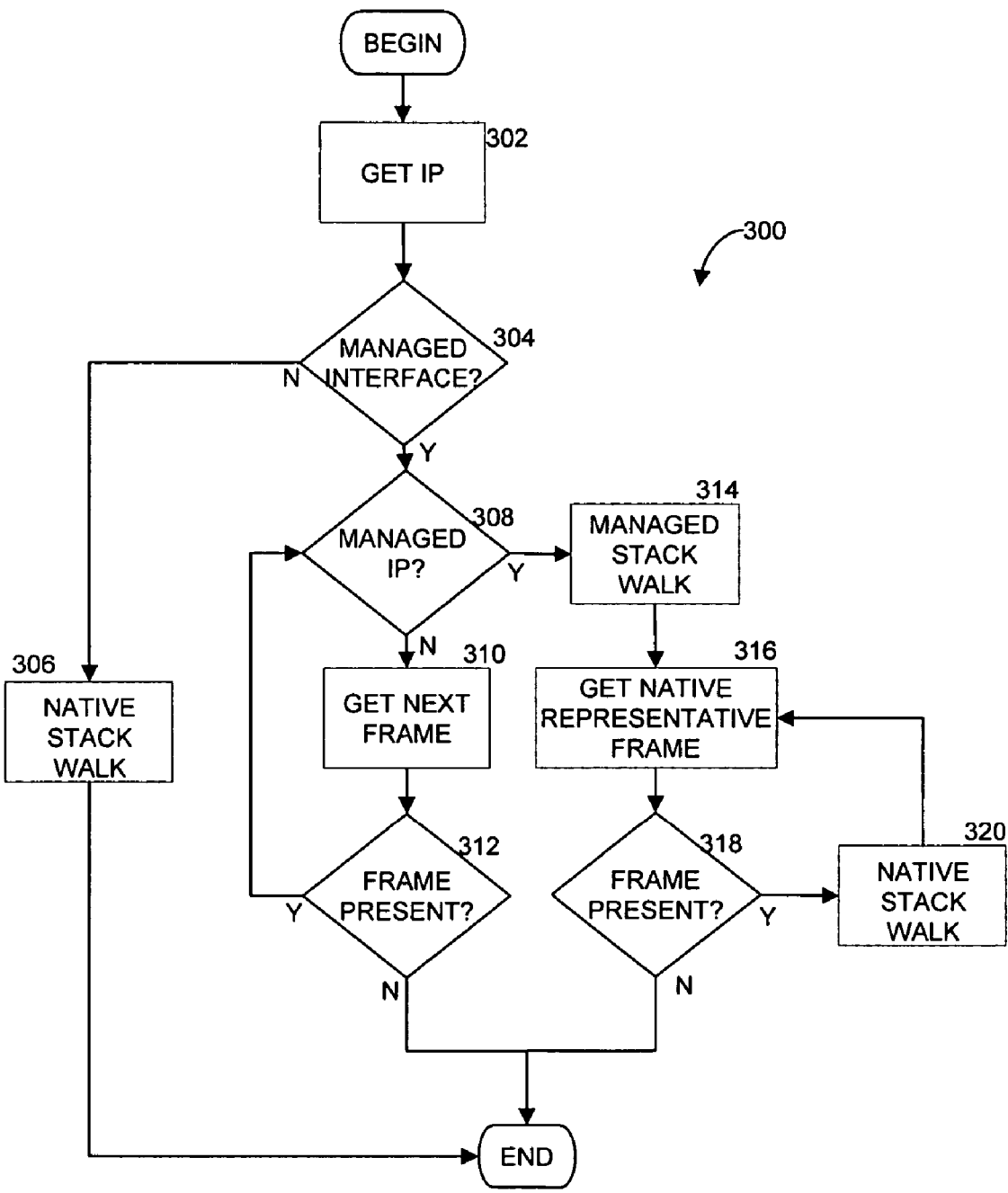
FIG. 3 is a flow chart showing a process for hybrid stack walking in accordance with one embodiment of the invention.

FIG. 3 is a flow chart illustrating one embodiment of a process 300 for stack walking by interleaving a native stack walking process with a managed stack walking process, which may be implemented as a hybrid stack walker. Furthermore, the hybrid stack walking process 300 may be implemented in a profiling sampler that samples a program under execution, a debugger, or an exception handler, as the invention is not limited in this respect.

In act 302, an executing program being sampled is locked and an instruction pointer is retrieved. The executing program may be locked in any manner, for example only a thread that is currently executing may be locked or interrupted, or any other locking or interrupting approach may be used. Upon locking the program, the instruction pointer retrieved points to the address of the instruction in the binary image that was being executed upon the lock or interruption.

In act 304, it is determined whether a managed interface or environment is registered. A managed interface or environment may comprise any interface or environment which supports the execution of managed code, where the managed code was at some point intermediate language code. As previously stated, the managed code may have been compiled during runtime using a JIT compiler that dynamically creates a native image of intermediate language code during the execution of a program, a Native Image Generator (NGEN) that creates native images of intermediate language code prior to execution and stores the native images in a native image cache, or any other intermediate language compiler, as the invention is not limited in this respect.

When process 300 determines that there is no managed interface or environment, process 300 proceeds to act 306 where a native stack walk is performed on the call stack. The lack of a managed interface or environment may be due to any number of reasons, including the absence of managed code in the executing program, an incorrect profiler configuration (that may not allow the establishment of a managed interface), version mismatch, one or more profiler installation errors, or any other reason, as the invention is not limited in this respect. Irrespective of the reason, the lack of a managed interface may inhibit the use of a managed stack walk, but a native stack walk may still be performed.

In act 306, a native stack walk may be performed to walk the stack and assemble the call chain for the executing program. The native stack walk performed may be of any type suitable to the walk the call stack, and may include a forward walking technique, a frame pointer walking technique, or any other technique as the invention is in no way limited in this respect. Once the call chain information has been assembled in act 306, process 300 terminates, the thread of the executing program that was locked is released, and the call chain information gathered by process 300 may be presented to a user, stored in a log file, or passed to any process that may have initiated the hybrid stack walking process 300.

When process 300 determines that a managed interface or environment is registered, process 300 proceeds to act 308 where a determination is made as to whether the instruction pointer retrieved in act 302 points to an instruction in the binary image of the executing program belonging to managed code. Equivalently, act 308 determines whether the program was locked while executing an instruction in a native code function. The determination in act 308, as to whether the instruction belongs to managed code or native code may be performed by using a map of the memory that contains information describing which regions correspond to managed and native code. Such a map of the memory may be created upon commencement of the program execution, or at any other suitable time, as the invention is not limited in this respect.

When it is determined that the instruction being executed was not part of managed code, process 300 proceeds to act 310 where an attempt is made to retrieve a call stack frame immediately preceding the active frame belonged to the native code function that was executing upon the lock. For example, the call stack frame immediately preceding the active frame may be retrieved using a native stack walk technique since the active frame is a native frame.

In act 312, a determination is made as to whether act 310 was successful in retrieving a stack frame, where a preceding stack frame may not be retrievable when process 300 is at the top of the stack and therefore no preceding call stack frames exist. When it is determined that no preceding stack frame is present, process 300 terminates, the thread of the executing program that was locked is released, and the call chain information may be presented to a user, stored in a log file, or passed to any process that may have initiated the hybrid stack walking process 300.

When it is determined that there exists a preceding stack frame, process 300 proceeds to act 308 once more, where is determined whether the preceding stack frame is a managed frame, associated with instructions of a managed function. Such a determination may be made in any suitable manner, for example, the return address from the retrieved preceding stack frame may be used to point to the return instruction in the associated function, and a determination may be made as to whether the return instruction is in managed code.

Acts 308, 310, and 312 are iterated until it is determined (in act 308) that a managed frame has been found, or until process 300 terminates due to reaching the top of the call stack in act 312. Upon determination that a managed frame has been found, process 300 proceeds to act 314 where a managed stack walk is performed and stack information is generated for each managed stack frame an for each native representative frame associated with native sub-chains. As previously noted, one native representative frame returned by a managed stack walk may in actuality correspond to a plurality of native frames, which the managed stack walk may not be able to resolve. As such, although the managed stack walk may return complete information for all managed frames in the call stack, each native representative frame may require further resolving.

Figure 4:
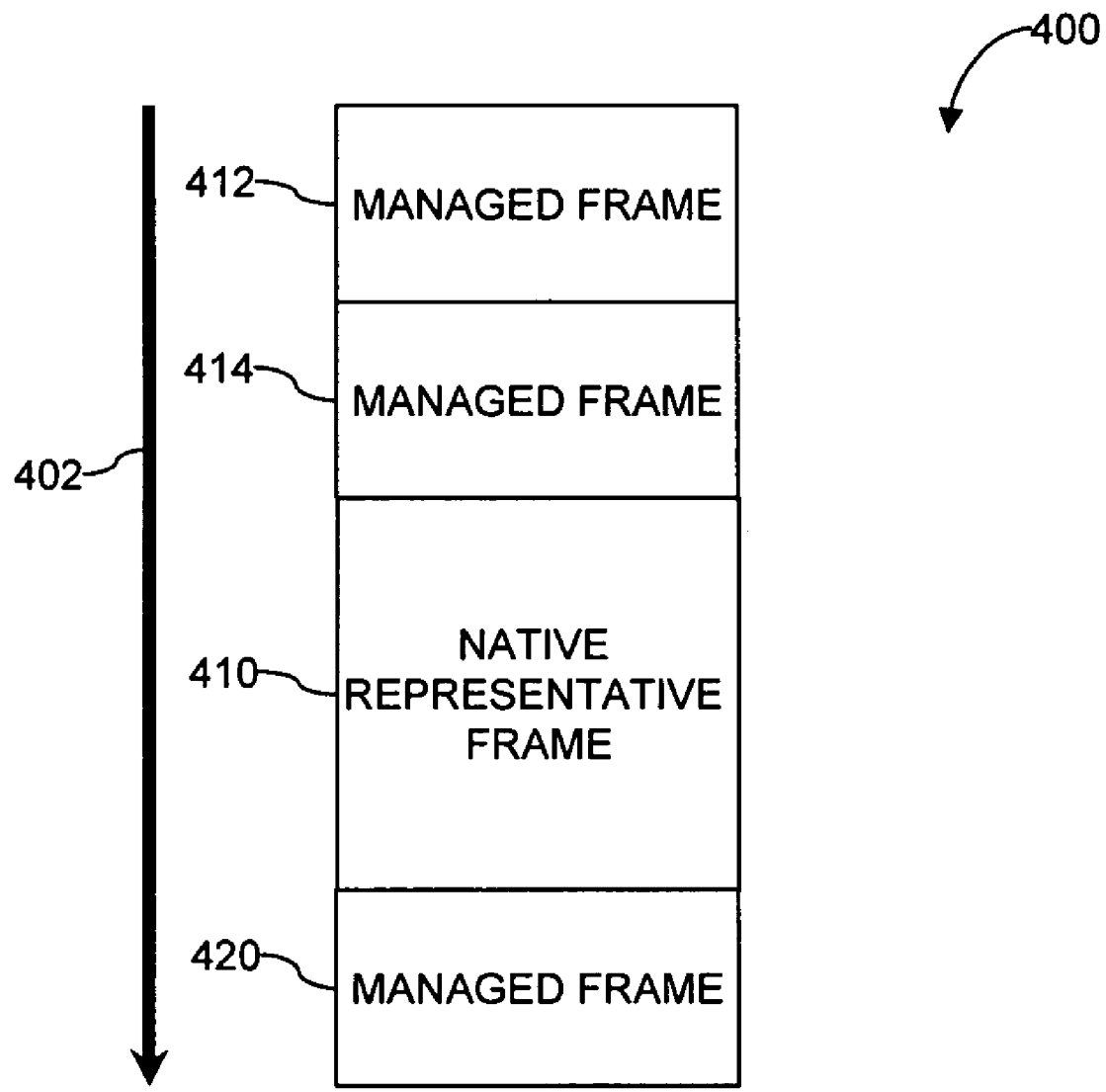
FIG. 4 is a diagram of call stack information generated by a managed stack walk.
Figure 5:
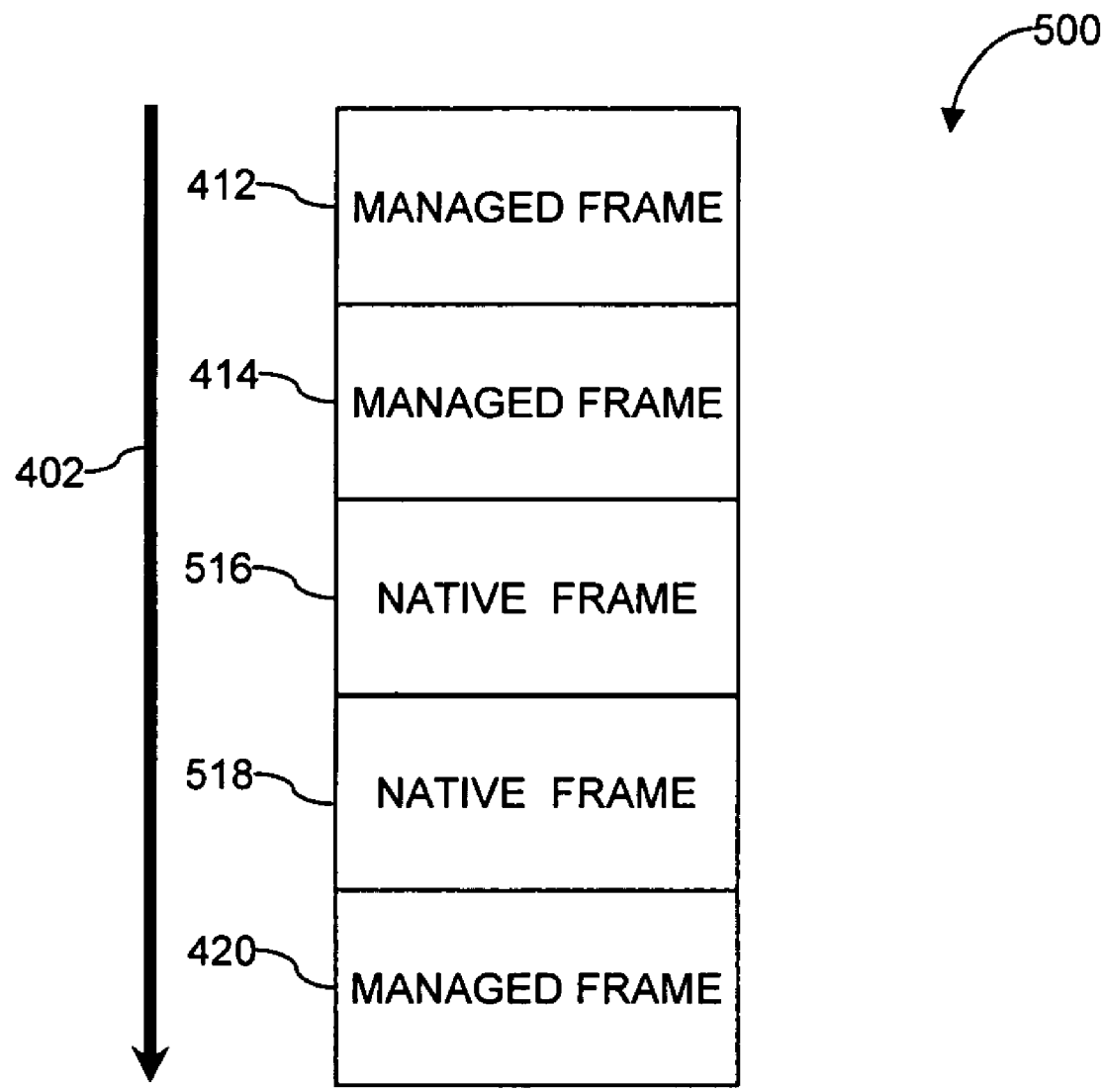
FIG. 5 is a diagram of call stack information with resolved native sub-chain information in accordance with one embodiment of the invention.

As an example, FIG. 4 illustrates a schematic of call stack information 400 generated by a managed stack walk technique applied to the mixed code calling chain 200 schematically described in FIG. 2. The managed stack walk returns information about a managed frame 412 at the beginning of the call stack, followed downwards 402 by managed frame 414, then native representative frame 410, and lastly managed frame 420. Although the managed stack walk may be used to gather resolved information for each managed frame associated with corresponding managed functions (i.e., managed frame 412 is associated with managed code function 212, managed frame 414 is associated with managed code function 214, and managed frame 420 is associated with managed code function 220), the managed stack walk process may only return information about a native representative frame 410 that may correspond to a native sub-chain comprising multiple native frames. In the example of FIG. 4, the native representative frame 410 corresponds to native sub-chain 210 comprising native code function 216 and 218, and therefore may be resolved into further native frames 516 and 518, as shown in a schematic of call stack 500 in FIG. 5.

To resolve the native representative frame information generated by the managed stack walk, process 300 performs act 316, 318, and 320 for each native representative frame which correspond to native sub-chains in the call stack. In act 316, an attempt is made to retrieve a native representative frame from the information generated by the managed stack walk. In act 318, a determination is made whether a native representative frame was present along the call chain information generated by the managed stack walking process.

When a native representative frame is present, process 300 proceeds to act 320, where a native stack walk is performed so as to resolve the stack frames that correspond to the native representative frame. Specifically, process 300 may use information about the native representative frame generated by the managed stack walk to determine a stack pointer at which the corresponding native sub-chain is located. Using the stack pointer for the native sub-chain, a native stack walk may be readily performed (in act 320) to resolve the native sub-chain.

Upon resolving the native representative frame, process 300 proceeds to resolve each remaining native representative frame, until the top of the stack is reached and a determination is made in act 318 that no more frames are present. The process 300 then terminates, the thread of the executing program that was locked is released, and the call chain information gathered by process 300 may be presented to a user, stored in a log file, or passed to any process that may have initiated the hybrid stack walking process 300.

In accordance with another embodiment of the invention a method is used to correctly walk the call stack in the case when an indirect jump to a next instruction is encountered in the instruction set. Indirect jumps are jumps whose target is in a register or memory location and may not be hard coded as a value in the instruction code.

Instances exist when a native stack walk may not function properly upon encountering an indirect jump. A potential reason is that it is not always simple to identify a jump target and thus a stack walker may abandon an instruction path being followed and attempt to execute the next instruction path using a breadth first search strategy.

However, Applicants have appreciated that there are instances in managed code where an indirect jump of the form "jmp eax" (where eax is a register in the x86 Architecture) results in a jump of the instruction pointer to the next instruction (i.e., thus this instruction acts as a no-operation, referred to as a "NOP", and such indirect jumps that act as NOPs are referred to as NOP indirect jumps). In one embodiment, when the native stack walking process encounters a NOP indirect jump, a determination is made as to whether the instruction belongs to managed code, and if so, proceeds with the next instruction.

Figure 6:
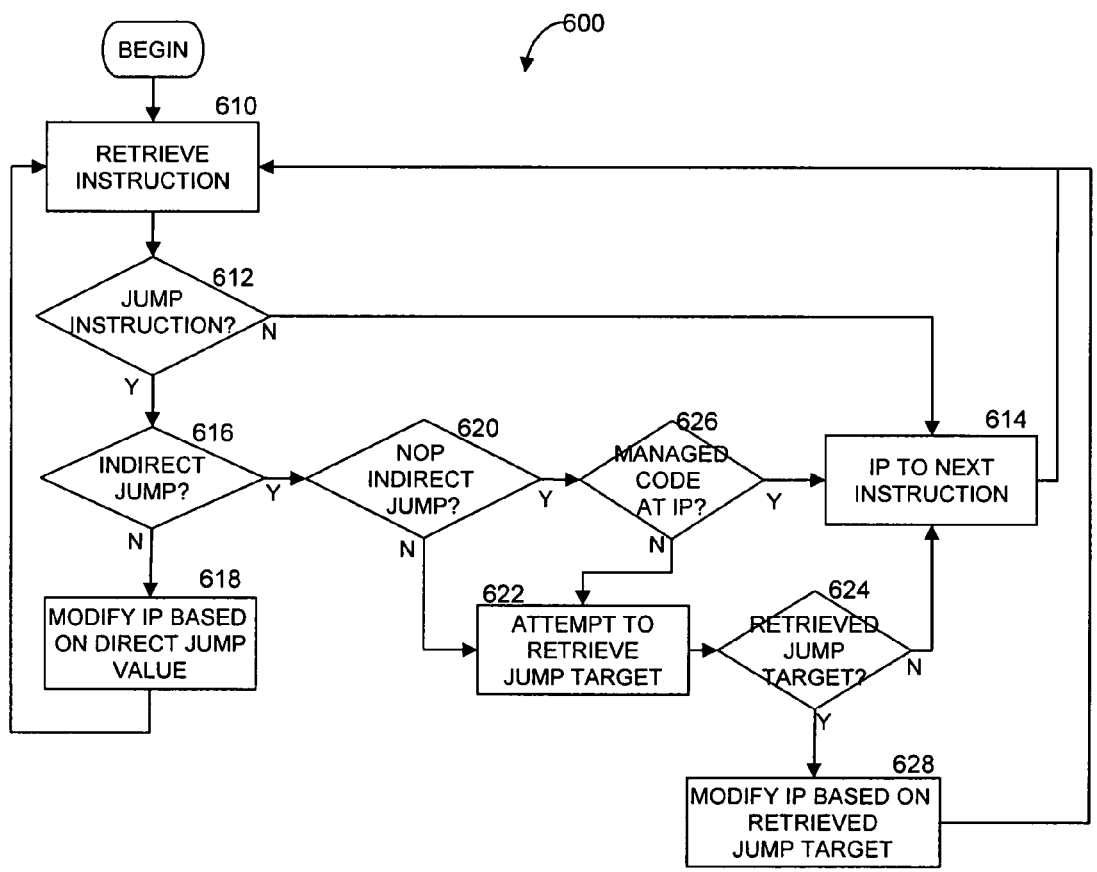
FIG. 6 is a flow chart showing a process for handling an indirect jump during a native stack walk in accordance with one embodiment of the invention.

FIG. 6 illustrates a flow chart for a process 600 for handling indirect jumps during a native stack walk. In some embodiments, process 600 may be performed after a lock has been initiated on the current thread of the executing program being sampled. Process 600 may be performed by a stack walker, or by one or more other components, as the invention is not limited in this respect. Process 600 begins in act 610, where an instruction that an instruction pointer is currently pointing to is retrieved. Process 600 proceeds to act 612, where a determination is made as to whether the current instruction is a jump instruction. When the current instruction is not a jump instruction, process 600 continues with act 614 and the instruction pointer is incremented so as to point to the next instruction. Then, in act 610, process 600 begins once more, and the current instruction that the instruction pointer now points to is retrieved.

When the current instruction is a jump instruction, process 600 proceeds with act 616, where a determination is made as to whether the current jump instruction is an indirect jump, whose target is in a register or memory location and is not hard coded as a value in the instruction code.

When the jump instruction is not an indirect jump, process 600 proceeds with act 618, where the instruction pointer is modified so as to point the instruction indicated by the value in the direct jump instruction, and process 600 then continues once more to perform act 610 using the current instruction.

When the jump is an indirect jump, process 600 performs act 620 where a determination is made as to whether the indirect jump is a NOP indirect jump. For example, a jump of the form "jmp eax" qualifies as a NOP indirect jump in the case of managed code in the Microsoft®.NET framework, but the invention need not be limited to this example, since the process for handling NOP indirect jumps may be applied to any framework.

When the jump is not a NOP indirect jump, process 600 proceeds to act 622 where an attempt is made to retrieve a jump target from memory. The attempt to retrieve the jump target may or may not be successful. For instance, an attempt to retrieve the jump target may not be successful because a stack walking process may be unwinding previously called functions, and there is no guarantee that memory values have not been altered since previously called functions were executed.

Process 600 then proceeds to perform act 624 where a determination is made as to whether the jump target was successfully retrieved (in act 622). When it is determined that the jump target was successfully retrieved, process 600 continues to act 628 where the instruction pointer is modified so as to point to the retrieved jump target. Then process 600 continues once more to perform act 610 using the current instruction.

When it is determined (in act 624) that the jump target was not successfully retrieved, process 600 performs act 614 where the instruction pointer is incremented so as to point to the next instruction. Then, in act 610, process 600 begins once more, and the current instruction that the instruction pointer now points to is retrieved.

In act 620, when the indirect jump is determined to be a NOP indirect jump, process 600 performs act 626, where a determination is made as to whether the instruction belongs to managed code. As noted, NOP indirect jumps may be present in managed code, whereas the same instruction in native code may not represent a NOP. Therefore, when the instruction is not in managed code (i.e., in native code), process 600 proceeds with the previously described act 622, and any acts that follow from act 622.

When the NOP indirect jump instruction is determined to be in managed code (in act 626), process 600 interprets the NOP indirect jump as "no operation" and increments the instruction pointer to the next instruction (in act 614). Process 600 then continues once more to perform act 610 using the current instruction.

When the NOP indirect jump instruction is determined to not be in managed code (in act 626), process 600 may proceed to perform previously described acts 622, 624, and 628, or any other acts may be performed in response to determining that the NOP indirect jump is not in managed code.

In accordance with another embodiment of the invention, a method determines the validity of a memory address, specifically whether the memory address contains an instruction that belongs to a binary image of executing code.

Traditionally, a native stack walker may determine whether an instruction is in a valid memory region before attempting to disassemble the instruction. When the instruction belongs to a native image, the memory address validity may be determined by performing a check of whether the address lies in an address range between "image_base" and "image_base+size," where the "image_base" is the start address of the executing code, and size represents the amount of memory the executing code occupies.

In contrast, when the instruction is managed, a modified approach may be utilized to determine memory address validity. For example, when the code is JIT compiled, then it is possible to construct a JIT memory map with the aid of CLR JIT notification APIs to ensure that the instruction is in valid memory. Specifically the CLR JIT notification APIs may generate a callback when placing JIT managed code in memory, and the callback may contain information as to the size and location of the JIT managed code.

However, there are instances where CLR places small stubs of code in memory without necessarily generating a callback that reports the size of that stub of code. Thus in such instances, or in any other instance where memory address validity is difficult to ascertain for any other reason, a process may be used to account for any difficulties.

In one embodiment, a process optimistically attempts to read a memory location and recover from a possible exception. Moreover, to reduce dependency on systems components, it may be desirable to not utilize simple exception handling mechanisms (e.g., try/catch) in a component that walks the stack (e.g., a profiler).

In other embodiments, when it is desirable for a profiler run time to not utilize standard exception handling mechanisms, the profiler may directly hook the exception handler and step past a fault. Using such a mechanism, a function may be implemented and used (e.g., in a profiler) to ascertain the validity of a location in memory.

Moreover, by using the abovementioned mechanism, it may be possible to ensure that a profiler is not reentrant, wherein reentrant means that when a profiler utilizes a function from a system component during stack walking, and the code being profiled is also using the system component function at the time of an interrupt, a deadlock may result. Such a situation may happen when the system component takes a lock, an interrupt occurs, and then a stack walker executing the system component function takes the same lock, resulting in a deadlock.

Figure 7:
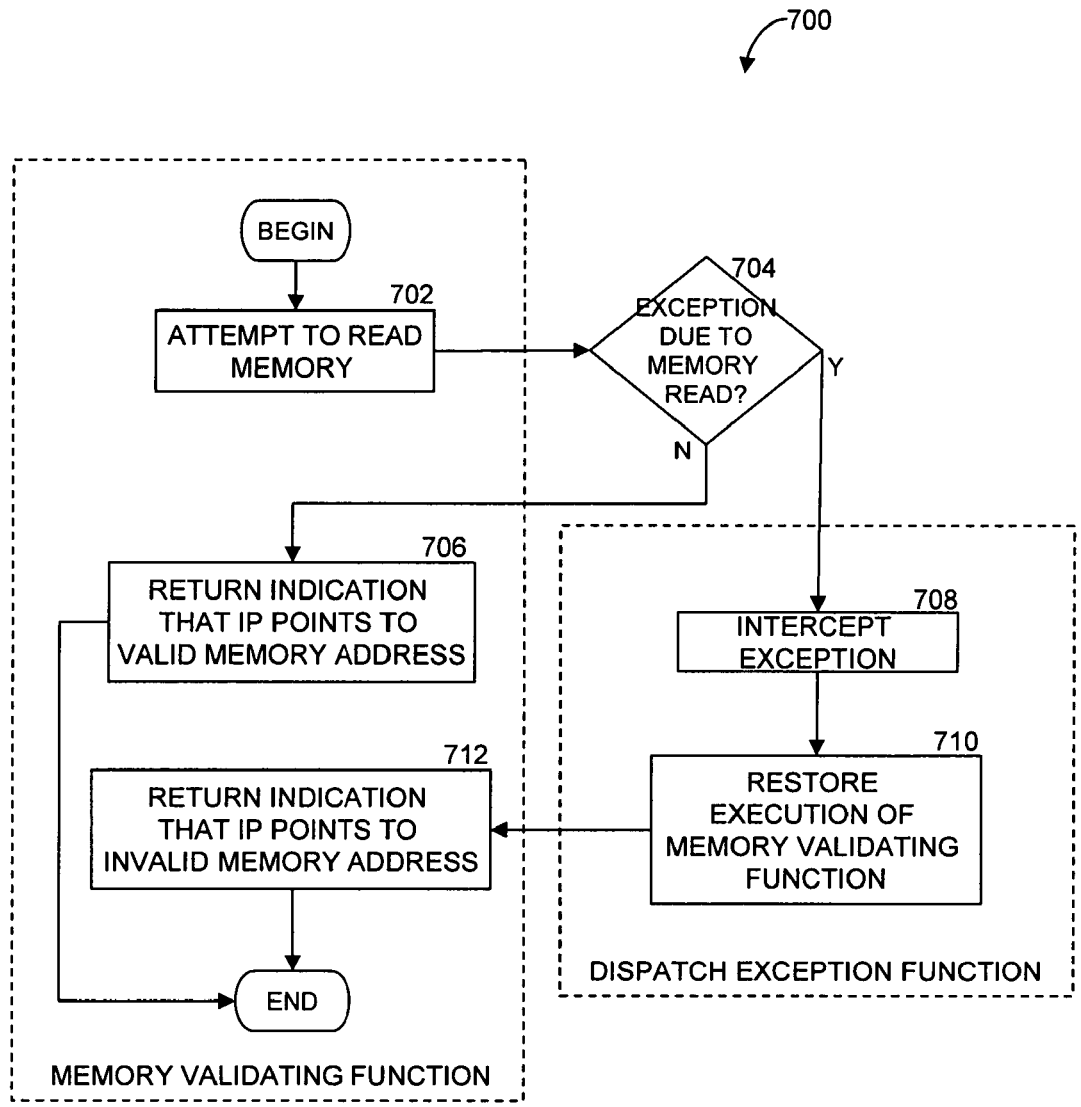
FIG. 7 is a flow chart showing a process for detecting validity of memory addresses in accordance with one embodiment of the invention.

FIG. 7 illustrates a flow chart for a process 700 for ascertaining the validity of a location in memory. Process 700 may be performed by one or more components, and the invention is not limited to the illustration associated with process 700. For example, in the illustration of process 700, a memory validating function may perform acts 702, 706 and 712, and a dispatch exception function may perform acts 708 and 710. Moreover, process 700 may be utilized within a profiler, or within any other program, to ascertain the validity for a location in memory.

Process 700 begins in act 702, where an attempt is made to read an instruction in memory pointed to by an instruction pointer. In act 704, a determination is made as to whether an exception occurred due to the act 702 of attempting to read the instruction in memory, and when no exception occurred, process 700 proceeds to act 706, where an indication is returned that the memory address pointed to by the instruction pointer is valid.

When an exception does occur due to the attempt to read the memory location (act 702), process 700 proceeds to act 708 where the exception is intercepted so as not to be handled by the standard exception handling system. Process 700 then proceeds to act 710, where process 700 restores execution of the memory validating function. Process 700 then proceeds to perform act 712, where an indication is returned that the memory address pointed to by the instruction pointer is invalid.

It should be appreciated that the restoration of execution of the memory validating function (act 710) may be such that the execution continues at any specified location in the instruction set of the memory validating function. In one embodiment, process 700 restores execution of the memory validating function to a location containing an instruction that may return an indication that the memory address is invalid.

In other embodiments, the dispatch exception function that performs acts 708 and 710 may determine whether the intercepted exception is due to an attempt to read a memory location. As such, the dispatch exception function may intercept different types of exceptions which may or may not be due to an attempt to read a memory location, and serves as a mechanism to intercept exceptions that would otherwise first be handled by the standard exception handling mechanism.

An example of code that may implement process 700 is shown in Tables 1 and 2. Table 1 illustrates an implementation of a memory validating function, and Table 2 illustrates an implementation of a dispatch exception function. Comments are included in the code presented in the tables (preceded by a "//" symbol), and the act in process 700 that the code line performs is included in some comments.

TABLE 1

```
unsigned char __declspec(naked) __fastcall
IsMemReadable(ULONGPTR) {
    __asm {
        mov eax, dword ptr[ecx]   //may cause a fault (ACT 702)
        mov eax, 1                //(ACT 706)
        ret
        mov eax, 0                //if fault, then set EIP back to this (ACT 712)
        ret
    }
}
```

TABLE 2

```
extern "C" bool WINAPI DispatchException(PEXCEPTION_RECORD
per, PCONTEXT pcontext)   //(ACT 708)
{
    if (pcontext->Eip == (DWORD)IsMemReadable) {
    // if we faulted here, that means we touched an invalid page
        pcontext->Eip += 8;
        // recover and report page not readable (ACT 710)
    }
}
```

The memory validating function, whose code is presented in Table 1, attempts to read a memory location pointed to by a pointer, corresponding to act 702 in process 700. When the attempt to read the memory location is successful, the function returns a unity value, corresponding to act 706.

When a fault occurs due to the attempt to read the memory location, the dispatch exception function, whose code is presented in Table 2, intercepts the exception before the exception is handled by the standard exception handling mechanism, corresponding to act 708. Furthermore, since the dispatch exception function may intercept many types of exceptions, a determination is made as to whether the intercepted exception is due to an attempt to read a memory location by the memory validating function, corresponding to the "if statement" in Table 2, and if this is the case, the dispatch exception function proceeds to return execution to the memory validating function, in act 710.

In the code presented in Table 2, the exception dispatch function increments the program counter by 8, which ensures that upon return to the memory validating function, presented in Table 1, execution continues with the instruction at the fourth line (since the second and third lines occupy eight bytes in memory), where a null value is returned by the memory validating function, indicating that the memory location is invalid. As should be realized, the exception dispatch function could return execution to any instruction in the memory validating function.

As should be appreciated from the foregoing, there are numerous aspects of the present invention described herein that can be used independently of one another, including the aspects that relate to hybrid stack walking, handling indirect jumps during a native stack walk, and detecting validity of a memory address.

However, it should also be appreciated that in some embodiments, all of the above-described features can be used together, or any combination or subset of the features described above can be employed together in a particular implementation, as the aspects of the present invention are not limited in this respect.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

It should be appreciated that the various methods outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code. In this respect, it should be appreciated that one embodiment of the invention is directed to a computer-readable medium or multiple computer-readable media (e.g., a computer memory, one or more floppy disks, compact disks, optical disks, magnetic tapes, etc.) encoded with one or more programs that, when executed, on one or more computers or other processors, perform methods that implement the various embodiments of the invention discussed above. The computer-readable medium or media can be transportable, such that the program or programs stored thereon can be loaded onto one or more different computers or other processors to implement various aspects of the present invention as discussed above.

It should be understood that the term "program" is used herein in a generic sense to refer to any type of computer code or set of instructions that can be employed to program a computer or other processor to implement various aspects of the present invention as discussed above. Additionally, it should be appreciated that according to one aspect of this embodiment, one or more computer programs that, when executed, perform methods of the present invention need not reside on a single computer or processor, but may be distributed in a modular fashion amongst a number of different computers or processors to implement various aspects of the present invention.

Various aspects of the present invention may be used alone, in combination, or in a variety of arrangements not specifically discussed in the embodiments described in the foregoing, and the aspects of the present invention described herein are not limited in their application to the details and arrangements of components set forth in the foregoing description or illustrated in the drawings. The aspects of the invention are capable of other embodiments and of being practiced or of being carried out in various ways. Various aspects of the present invention may be implemented in connection with any type of network, cluster or configuration. No limitations are placed on the network implementation.

Accordingly, the foregoing description and drawings are by way of example only.

Also, the phraseology and terminology used herein is for the purpose of description and should not be regarded as limiting. The use of "including," "comprising," or "having," "containing," "involving," and variations thereof herein, is meant to encompass the items listed thereafter and equivalent thereof as well as additional items.

What is claimed:

1. A method of stack walking a call stack associated with mixed code, wherein the mixed code comprises at least one managed instruction and at least one native instruction, the method comprising the acts of:

providing a call stack comprising at least one managed frame and at least one native frame, the at least one managed frame being associated with a first function having at least one managed instruction, the managed frame containing a first return address, and the at least one native frame being associated with a second function having at least one native instruction, the native frame containing a second return address;

performing a stack walk of the call stack to detect a managed frame on the call stack;

in response to detecting a managed frame on the call stack, performing a managed stack walk of managed frames on the call stack to resolve the managed frames on the call stack; and after performing the managed stack walk, performing a native stack walk of native frames on the call stack to resolve the native frames on the call stack, including native frames between managed frames.

2. The method of claim 1, further comprising an act of generating information about the at least one managed frame as a result of performing the managed stack walk.

3. The method of claim 2, further comprising an act of generating representative information about the at least one native frame as a result of performing the managed stack walk.

4. The method of claim 3, wherein the at least one native frame comprises a plurality of successive native frames, the method further comprising generating information about each native frame in the plurality of successive native frames as a result of performing the native stack walk.

5. The method of claim 1, further comprising an act of:
performing a native stack walk on the at least one managed frame of the call stack,
including, upon encountering a NOP indirect jump instruction, proceeding to a next instruction.

6. The method of claim 1, further comprising an act of:
performing a native stack walk on the at least one managed frame of the call stack,
including reading a memory location using a memory validating function, and moving onto a specific instruction in the memory validating function in response to intercepting an exception due to reading the memory location.

7. The method of claim 6, further comprising determining a validity of the memory location at least partially based on intercepting the exception due to reading the memory location.

8. At least one computer readable medium encoded with a plurality of instructions, that when executed, perform a method of stack walking a call stack associated with mixed code, the mixed code comprising at least one managed instruction and at least one native instruction, the method comprising:

providing a call stack comprising at least one managed frame and at least one native frame, the at least one managed frame being associated with a first function having at least one managed instruction, the managed frame containing a first return address, and the at least one native frame being associated with a second function having at least one native instruction, the native frame containing a second return address;

performing a stack walk of the call stack to detect a managed frame on the call stack in response to detecting a managed frame on the call stack, performing a managed stack walk of managed frames on the call stack to resolve the managed frames on the call stack; and after performing the managed stack walk, performing a native stack walk of native frames on the call stack to resolve the native frames on the call stack, including native frames between managed frames.

9. The at least one computer readable medium of claim 8, wherein the method further comprises an act of generating information about the at least one managed frame as a result of performing the managed stack walk.

10. The at least one computer readable medium of claim 9, wherein the method further comprises an act of generating representative information about the at least one native frame as a result of performing the managed stack walk.

11. The at least one computer readable medium of claim 10, wherein the at least one native frame comprises a plurality of successive native frames, the method further comprising generating information about each native frame in the plurality of successive native frames as a result of performing the native stack walk.

12. The at least one computer readable medium of claim 8, the method further comprising an act of:

performing a native stack walk on the at least one managed frame of the call stack, including, upon encountering a NOP indirect jump instruction, proceeding to a next instruction.

13. The at least one computer readable medium of claim 8, the method further comprising an act of:

performing a native stack walk on the at least one managed frame of the call stack, including reading a memory location using a memory validating function, and moving onto a specific instruction in the memory validating function in response to intercepting an exception due to reading the memory location.

14. The at least one computer readable medium of claim 13, the method further comprising determining a validity of the memory location at least partially based on intercepting the exception due to reading the memory location.

15. At least one computer for stack walking a call stack associated with mixed code, wherein the mixed code comprises at least one managed instruction and at least one native instruction, the at least one computer comprising:

at least one processor programmed to provide a call stack comprising at least one managed frame and at least one native frame, the at least one managed frame being associated with a first function having at least one managed instruction, the managed frame containing a first return address, and the at least one native frame being associated with a second function having at least one native instruction, the native frame containing a second return address, to perform a stack walk of the call stack to detect a managed frame on the call stack; in response to detecting a managed frame on the call stack, to perform a managed stack walk of managed frames on the call stack to resolve the managed frames on the call stack: and after performing the managed stack walk, to perform a native stack walk of native frames on the call stack to resolve the native frames on the call stack, including native frames between managed frames.

16. The at least one computer of claim 15, wherein the at least one processor is further programmed to generate information about the at least one managed frame as a result of performing the managed stack walk on the call stack.

17. The at least one computer of claim 16, wherein the at least one native frame comprises a plurality of successive native frames, and wherein the at least one processor is further programmed to generate information about each native frame in the plurality of successive native frames as a result of performing the native stack walk.

18. The at least one computer of claim 15, wherein the at least one processor is further programmed to perform a native stack walk on the at least one managed frame of the call stack, and wherein performing the native stack walk on the at least one managed frame of the call stack comprises, upon encountering a NOP indirect jump instruction, proceeding to a next instruction.

19. The at least one computer of claim 15, wherein the at least one processor is further programmed to perform a native stack walk on the at least one managed frame of the call stack, and wherein performing the native stack walk on the at least one managed frame of the call stack comprises reading a memory location using a memory validating function, and moving onto a specific instruction in the memory validating function in response to intercepting an exception due to reading the memory location.

20. The at least one computer of claim 19, wherein the at least one processor is further programmed to determine a validity of the memory location at least partially based on intercepting the exception due to reading the memory location.

* * * * *